United States Patent
Lu et al.

(10) Patent No.: US 10,652,032 B2
(45) Date of Patent: May 12, 2020

(54) DEVICE SIGNATURE GENERATION

(71) Applicant: Taiwan Semiconductor Manufacturing Company, Ltd., Hsinchu (TW)

(72) Inventors: Shih-Lien Linus Lu, Hsinchu (TW); Anthony Oates, Hsinchu (TW); Ming-Hsien Lin, Hsinchu County (TW); Shou-Chung Lee, Hsinchu (TW)

(73) Assignee: Taiwan Semiconductor Manufacturing Company, Ltd. (TW)

( * ) Notice: Subject to any disclaimer, the term of this patent is extended or adjusted under 35 U.S.C. 154(b) by 228 days.

(21) Appl. No.: 15/628,091

(22) Filed: Jun. 20, 2017

(65) Prior Publication Data

US 2018/0367318 A1 Dec. 20, 2018

(51) Int. Cl.
| | |
|---|---|
| *H04L 9/32* | (2006.01) |
| *G06F 21/44* | (2013.01) |
| *G06F 21/73* | (2013.01) |
| *G06F 21/70* | (2013.01) |
| *G06K 19/073* | (2006.01) |
| *G09C 1/00* | (2006.01) |
| *G11C 16/20* | (2006.01) |

(52) U.S. Cl.
CPC ............ *H04L 9/3278* (2013.01); *G06F 21/44* (2013.01); *G06F 21/70* (2013.01); *G06F 21/73* (2013.01); *G06K 19/073* (2013.01); *G09C 1/00* (2013.01); *G11C 16/20* (2013.01)

(58) Field of Classification Search
CPC ....... H04L 9/3278; G06F 21/44; G06F 21/70; G06F 21/72; G06F 21/73; G06K 19/073
See application file for complete search history.

(56) References Cited

U.S. PATENT DOCUMENTS

| | | | | |
|---|---|---|---|---|
| 4,620,845 A * | 11/1986 | Popovich | .............. | A61L 2/10 604/28 |
| 5,532,955 A * | 7/1996 | Gillingham | .......... | G11C 11/565 365/149 |
| 6,262,550 B1 * | 7/2001 | Kliman | .............. | G05B 23/0264 318/565 |
| 6,700,384 B2 * | 3/2004 | Yugou | .............. | G01R 19/16542 324/434 |
| 8,525,169 B1 * | 9/2013 | Edelstein | .............. | H01L 23/544 257/48 |
| 10,002,661 B2 * | 6/2018 | Fritsch | .................. | G11C 11/419 |
| 2006/0002482 A1 * | 1/2006 | Walker | ................ | G06F 13/4072 375/257 |

(Continued)

OTHER PUBLICATIONS

X. Chen, L. Wang, Y. Wang, Y. Liu and H. Yang, "A General Framework for Hardware Trojan Detection in Digital Circuits by Statistical Learning Algorithms," in IEEE Transactions on Computer-Aided Design of Integrated Circuits and Systems, vol. 36, No. 10, pp. 1633-1646, Oct. 2017. (Year: 2017).*

(Continued)

*Primary Examiner* — Kari L Schmidt
(74) *Attorney, Agent, or Firm* — Merchant & Gould P.C.

(57) ABSTRACT

Methods and systems for generating a signature for a device include pre-charging a plurality of conductors to a first voltage level. A voltage leakage for each of the conductors is determined, and a device signature is generating based on the determined leakage.

18 Claims, 9 Drawing Sheets

(56) References Cited

U.S. PATENT DOCUMENTS

| | | | | |
|---|---|---|---|---|
| 2008/0238447 | A1* | 10/2008 | de la Torre Vega | H04L 12/10 324/676 |
| 2009/0051410 | A1* | 2/2009 | Hussain | G06F 1/266 327/524 |
| 2009/0085631 | A1* | 4/2009 | Lambrecht | G06F 13/4291 327/299 |
| 2010/0293384 | A1* | 11/2010 | Potkonjak | H04L 9/3247 713/176 |
| 2011/0012667 | A1* | 1/2011 | Yamkovoy | H03K 5/1254 327/434 |
| 2011/0153263 | A1* | 6/2011 | Oda | G06F 3/03545 702/150 |
| 2013/0019324 | A1* | 1/2013 | Tehranipoor | H03K 3/0315 726/34 |
| 2013/0133031 | A1* | 5/2013 | Fainstein | G06F 21/44 726/2 |
| 2014/0201851 | A1* | 7/2014 | Guo | H04L 9/0866 726/34 |
| 2014/0327469 | A1* | 11/2014 | Pfeiffer | H03K 19/003 326/8 |
| 2017/0178710 | A1* | 6/2017 | Augustine | G11C 7/24 |
| 2017/0307464 | A1* | 10/2017 | Hasselbeck | G01M 3/243 |

OTHER PUBLICATIONS

R. Helinski, D. Acharyya and J. Plusquellic, "A physical unclonable function defined using power distribution system equivalent resistance variations," 2009 46th ACM/IEEE Design Automation Conference, San Francisco, CA, 2009, pp. 676-681. (Year: 2009).*

Chakraborty, Raj, et al. "A transmission gate physical unclonable function and on-chip voltage-to-digital conversion technique." Proceedings of the 50th Annual Design Automation Conference. ACM, 2013. (Year: 2013).*

Kim et al., "Comprehensive Performance Analysis of Interconnect Variation by Double and Triple Patterning Lithography Processes," Journal of Semiconductor Technology and Science, vol. 14, No. 6, pp. 824-831 (Dec. 2014).

Lin et al., "Electrical Properties of Low-k Dielectric in Copper Interconnect Structures," 20th IEEE International Symposium on the Physical and Failure Analysis of Integrated Circuits (IPFA), pp. 208-211 (2013).

Tsu et al., "Leakage and Breakdown Reliability Issues Associated with Low-K Dielectrics in a Dual-Damascene Cu Process," 38th Annual International Reliability Physics Symposium, San Jose, California, pp. 348-353 (2000).

* cited by examiner

DEVICE SIGNATURE GENERATION

BACKGROUND

As reliance on computer systems and the internet increases in many areas such as personal communications, shopping, banking, commerce, etc., the need for improved cyber security also increases. Many security measures may be employed, including cryptography. A physical unclonable function (PUF) is a physical object embodied in a physical structure that can be used to produce an output. The output is easy to evaluate but the output is very hard or nearly impossible to predict. A PUF can be used as a unique identification or key in secure computing and communication.

An individual PUF device must be easy to make but practically impossible to duplicate, even given the exact manufacturing process that produced it. In this respect it is the hardware analog of a one-way function. PUFs are typically implemented in integrated circuits and are typically used in applications with high security requirements.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
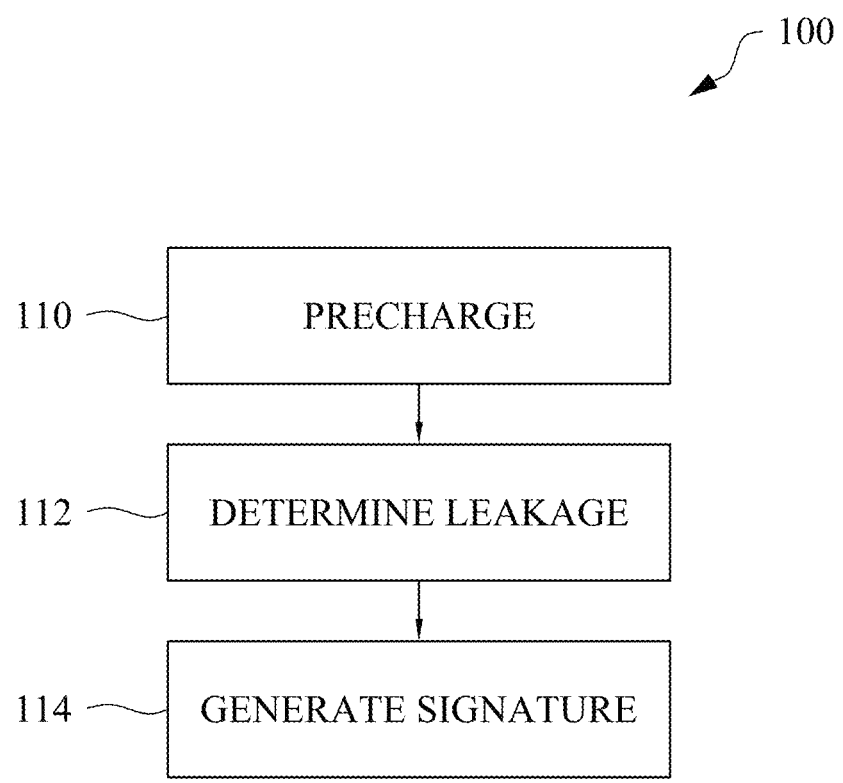
FIG. 1 is a process flow diagram illustrating aspects of a method for generating a device signature in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

As noted above, a physical unclonable function (PUF) is a physical object embodied in a physical structure that can be used to produce an output that is easy to evaluate but nearly impossible to predict. There are many different implementation approaches to PUF. For example, there are delay chain based PUFs, wherein the PUF translates variations (difference) into delay variances. They employee a set of delay chains made out of logic gates. Due to static variations of components, each chain will have different delay. By sampling the delay, a signature can be produced.

Another approach is a memory-based PUF, wherein variations of devices in a bi-stable element are translated to generate either a "1" or "0". A particular type of memory-based PUF is a static random access memory (SRAM) PUF. These PUFs utilize small memory cell variations to produce signatures. For example, one type of SRAM PUF gets its signatures from the start up states of cells.

Integrated circuit (IC) devices generally include electronic circuits formed on a semiconductor substrate, or "chip," formed of a semiconductor material such as silicon. The integration of large numbers of tiny components results in circuits that are orders of magnitude smaller, cheaper, and faster than those constructed of discrete electronic components. Since their origins, the size, speed, and capacity of IC devices have progressed enormously, driven by technical advances that allow more and more transistors on chips of the same size.

Components of IC devices are formed on the substrate by a photolithography process rather than being constructed one item at a time. The electronic devices formed on the substrate are interconnected by conductors, or wires, also formed on the substrate by photolithographic processes. Although manufactured in high volume, each IC device is unique due to physical randomness, even with the same manufacturing processes materials. This inherent variation can be extracted and used as its unique identification, as DNA to human beings. In accordance with embodiments disclosed herein, such variation is used to create a unique IC device signature used as a PUF, since it is unique, inherent to the particular device, unclonable (cannot be mimicked or duplicated), repeatable, etc.

A PUF design requires a difference generator/harvester, among other things to obtain the inherent differences among manufactured devices to generate the PUF signature. As semiconductor technology advances, patterning of narrow interconnecting conductors has become a greater challenge. As a result, electrical parameters such as resistance and capacitance may differ among identical parallel lines in the same substrate layers.

Further, in certain metal conductive structures there is an electrical transport among neighboring lines (intra-metal) when there is a difference in voltage potential between them, which causes an electrical stress. This phenomenon produces a stressed behavior in the metal-insulator-metal capacitor stack. This temporary conduction leads to a leakage current which is different between pairs of interconnects due to manufacturing variations. Additional leakage sources include, for example, gate leakage, which also varies from device to device.

Since capacitances and leakage currents of IC device conductors are different and unique, they are used in disclosed embodiments as difference generators to create IC device signatures. In some examples, each signature conductor of the device produces one bit of output. The output value will depend on factors such as the capacitance value and the leakage current associated with each of the signature conductors.

FIG. 1 is a process flow diagram generally illustrating aspects of an example method 100 for generating a signature for a device. At block 110, a plurality of conductors of an IC device are pre-charged to a first voltage level. Once the conductors are pre-charged to the desired level, a voltage leakage of each of the conductors is determined at block 112, and the determined leakage is used to generate a device signature at block 114. In some embodiments, the signature conductors are pre-charged and equalized to a voltage above Vcc/2. After the pre-charging operation of block 110, all of the signature conductors are left floating, and after some predetermined time period, voltage levels of the conductors are determined and compared to a predetermined level as part of the leakage determination process shown at block 112. The time required for voltage level of the conductors to change (due to leakage) from the pre-charge level to some other predetermined level is used to generate the device signature in block 114.

Figure 2:
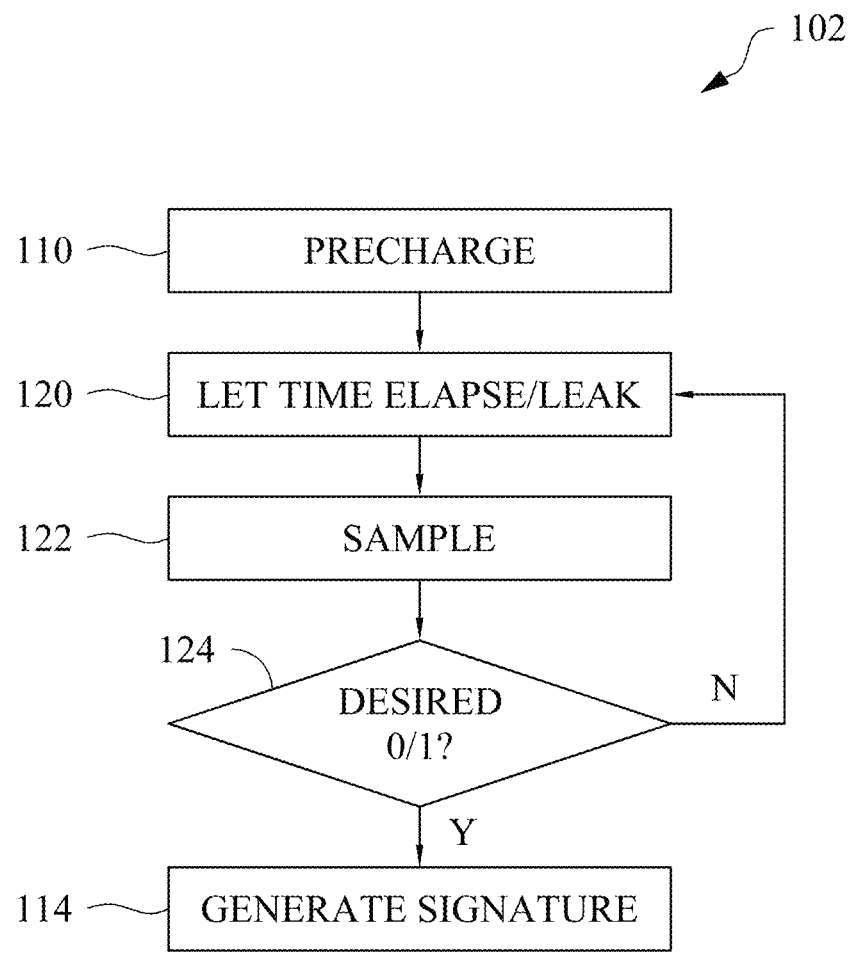
FIG. 2 is another process flow diagram illustrating aspects of a method for generating a device signature in accordance with some embodiments.

FIG. 2 is another flow diagram illustrating further aspects of an example process 102. As noted in conjunction with FIG. 1, the conductors are pre-charged to a desired voltage level. This pre-charge voltage level is a logic HIGH level in some implementations. At block 120, a predetermined time period is allowed to elapse, during which time the conductors are left floating, and thus the pre-charged voltage level of the conductors falls due to leakage of the conductors. Once the predetermined time period of block 120 has elapsed, the voltage level of each of the conductors is sampled at block 122. Due to inherent variations in the IC device, the leakage of the conductors will vary. Accordingly, the voltage levels of the conductors will fall at different rates. When the voltage levels of the conductors is sampled at block 122, the pre-charge voltage levels of some conductors will have fallen past a threshold such that the voltage level is now at a logic LOW, while the voltage level of other conductors remain at a logic HIGH, due to variation in leakage.

In some embodiments, the signature may be determined based on the voltage levels of each of the conductors after the predetermined elapsed time period, where the corresponding voltage logic level is determined for each of the conductors, which make up each bit of the device signature. However, depending on the leakage rate, this could result in virtually all of the conductors remaining at or near the pre-charge voltage level (logic level HIGH). Thus, most or all of the bits of the device signature would be 1s. On the other hand, if the leakage rate is higher, virtually all of the conductors could have leaked to logic LOW voltage. Thus, most or all of the bits of the device signature would be 0s.

In some implementations, it is desirable to establish a device PUF signature where a predetermined portion of the signature bits are logic 1s or 0s. Thus, in the example shown in FIG. 2, the respective number of conductors having voltage levels at logic HIGH and LOW is determined when the voltage levels are sampled in block 122. At block 124, if the desired number of conductors are at logic LOW and HIGH (0/1) voltage levels, the device signature is generated at block 114. If in block 124 it is determined that the desired number of conductors are not at logic LOW and HIGH (0/1) voltage levels, the predetermined time period is again allowed to elapse at block 120, and the logic levels are again sampled at block 122. The process is repeated until the desired distribution of conductors at logic LOW and HIGH (0/1) voltage levels is achieved, upon which the signature is generated at block 114.

In some examples, the signature is output when the number of conductors having voltage levels at logic LOW and HIGH (0/1) are approximately equal. Thus, when the decision block 124 determines that 50% of the conductor voltage levels have fallen to the logic LOW level due to leakage, the signature is output at block 114.

Figure 3:
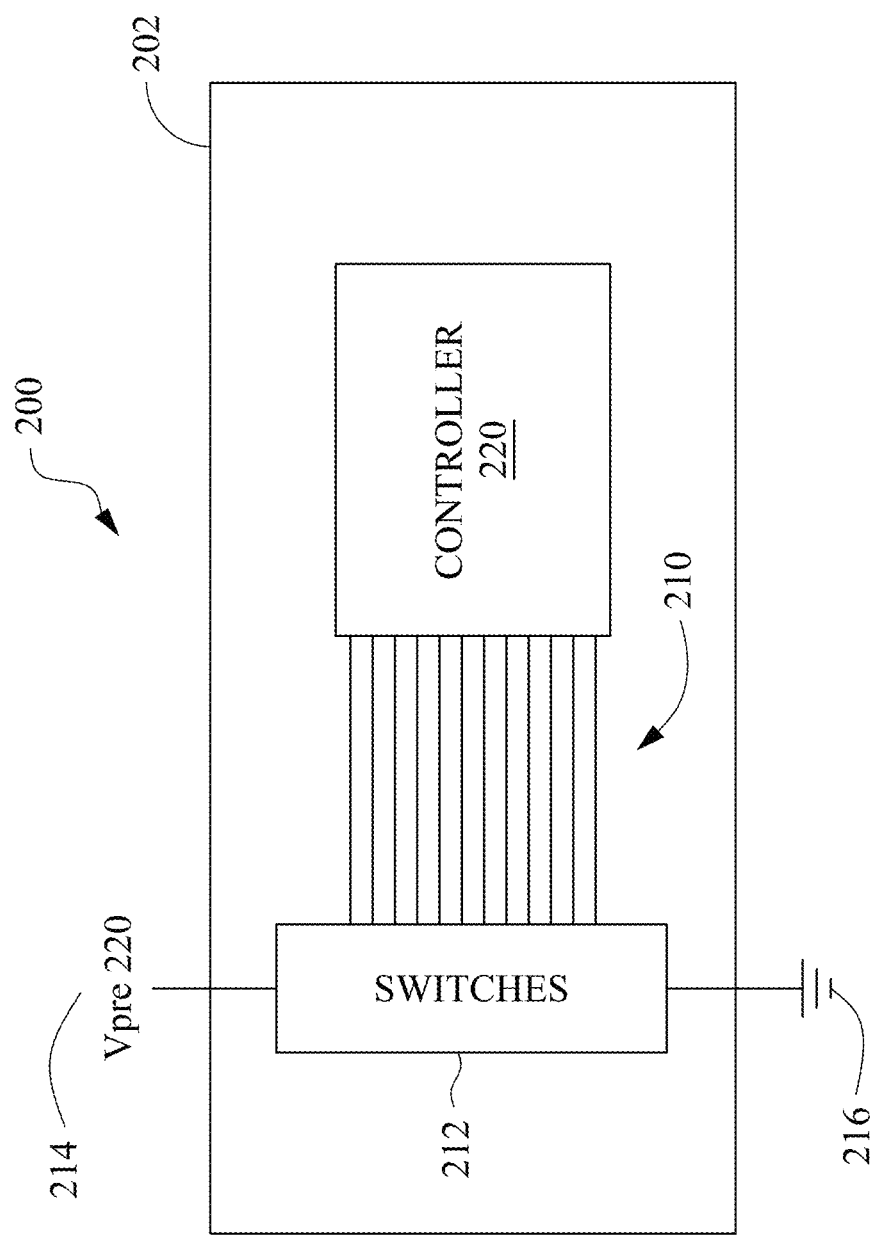
FIG. 3 is a block diagram illustrating aspects of an example system for generating a device signature in accordance with some embodiments.

FIG. 3 is a block diagram illustrating aspects of an example system 200 for outputting the device signature. In general, the system 200 includes a plurality of conductors, or wires 210. A plurality of switching devices 212 are configured to selectively connect the plurality of conductors 210 to a power source 214. In certain examples, the device 200 is an IC device, which includes a substrate 202 having the conductors 210 and switches 212 formed thereon. As noted above in conjunction with FIG. 1, the conductors 210 are pre-charged to a desired voltage level $V_{pre}$. A controller 220 is configured to operate the switches 212 to connect the conductors 210 to the pre-charge voltage level $V_{pre}$, thus selectively charging the conductors 210 to a first voltage level. The controller is further configured to output a device signature based on the voltage leakage of the plurality of conductors 210, for example, by various processes discussed herein. In FIG. 3, the controller 220 is shown as an integrated component of the device 200, formed on the substrate 200 along with the conductors 210 and switches 212. In other embodiments, the controller could be a separate component, which interfaces with the switches 212 and conductors 210 for the purpose of generating the device signature.

Figure 4:
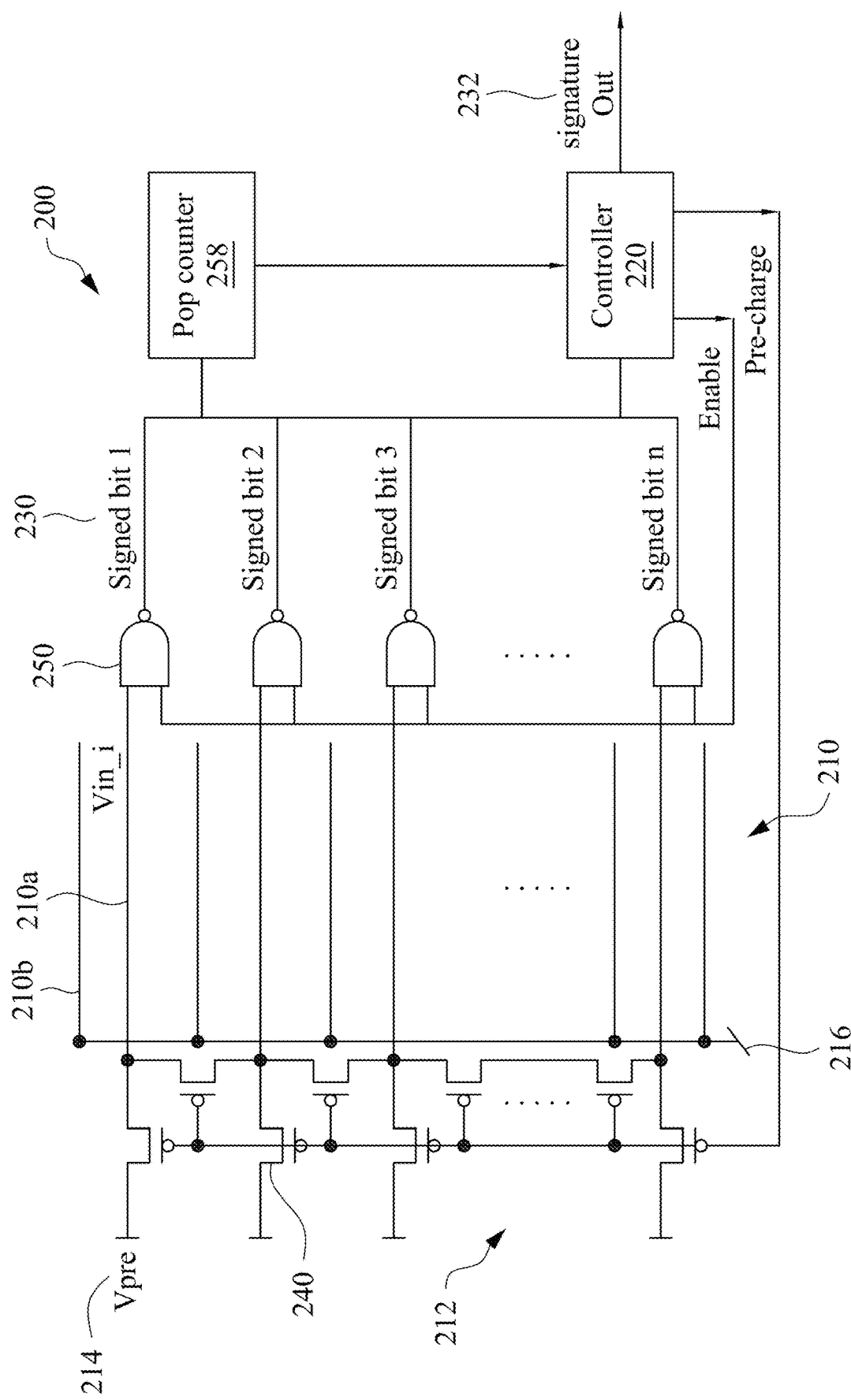
FIG. 4 is a circuit diagram illustrating further aspects of the system shown in FIG. 3.

FIG. 4 illustrates further aspects of the example shown in FIG. 3. As shown in FIG. 4, the conductors 210 comprise sets of wires grouped in pairs, including a signature wire 210a connected to the pre-charge voltage terminal 214, and a ground wire 210b connected to a ground terminal 216. Each pair of wires 210 generates a different voltage due to leakage variations. The different voltages generated by each wire pair 210 are each amplified and translated into corresponding signature bits 230 (labeled signature bit 1 through signature bit n in FIG. 4), which form the device signature 232 output by the device 200.

In the illustrated example, the wire pairs 210 are adjacent to each other physically on the substrate 202, that is, they are interleaved. In FIG. 4, the switching devices 212 comprise transistors 240, which are PMOS transistors in the illustrated example. The signature wire 210a of each wire pair 210 is connected to a corresponding one of the transistors 240, which is connected to the pre-charge voltage terminal 214. The transistors 240 are turned on by the controller 220, which is connected to the gate terminals of the transistors 240, to pre-charge the signature wires 210b to the pre-charge voltage $V_{pre}$. The transistors 240 are then turned off after a predetermined time period elapses as shown in FIG. 2. Due to leakage of the conductors 210 (and transistors 240), the voltage on the signature wire 210a will degrade gradually.

Figure 5:
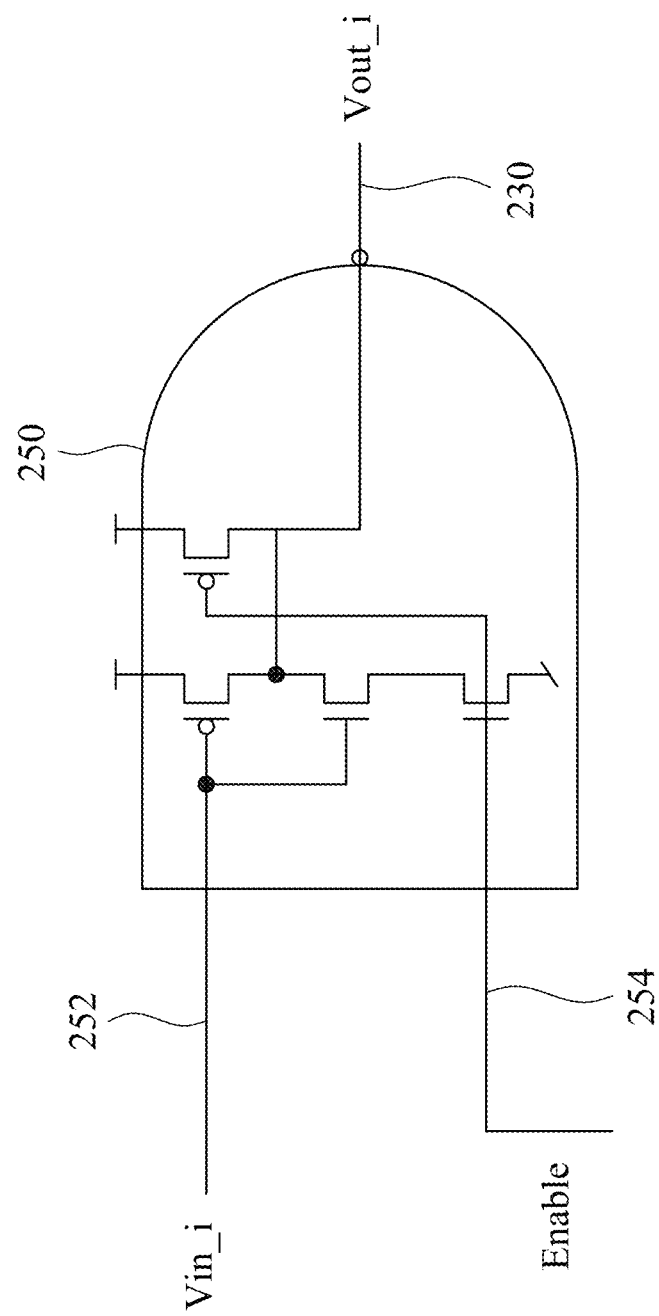
FIG. 5 is a circuit diagram illustrating an example of a portion of the circuit shown in FIG. 4.

Each signature wire 210a is connected to a comparator device, which in FIG. 4 is a single-ended sense amplifier made out of a NAND logic gate 250. The circuit of the NAND gate is shown in FIG. 5. Each of the signature wires 210a is connected to one input terminal 252 of the NAND gate 250, such that each signature wire 210a inputs a respective input voltage Vin_i to the NAND gate 250. The NAND gate 250 acts as a clocked inverter, where the device 250 provides a digital output Vout_i that depends on the input voltage Vin_i and the inverter transfer curve. Each of the digital outputs Vout_i is one bit of the device signature 232.

A second input 254 of each of the NAND gates 250 receives an enable voltage. After the predetermined time has elapsed (block 120 in FIG. 2), all of the NAND gates 250 are enabled (enable signal goes HIGH) to detect the voltage levels of the signature wires 210a. Due to the voltage level and the transfer curve characteristics of each sense amplifier, or NAND gate 250, the output Vout_i will be a logic LOW (0) if the voltage level of the signature wire 210a has not decreased sufficiently from the pre-charge voltage level $V_{pre}$. In other words, the NAND gate 250 has not detected enough change in input voltage (i.e. NAND gate 250 inputs 252, 254 are 1,1). The NAND gate 250 output Vout_i will be a logic HIGH if the voltage level of the signature wire 210a has not decreased from the pre-charge voltage level $V_{pre}$ to a point below a threshold voltage due to leakage, indicating the voltage level of the signature wire 210a has fallen to logic LOW (i.e. NAND gate 250 inputs 252, 254 are 0,1).

The resulting signature bits 230 will have a distribution of 0s and is depending on the timing of the enable signal as well as the transfer curve of the NAND gates 250. A counter 258 counts the number of logic HIGHs (1s) output by the NAND gates 250. In the example shown in FIG. 4, if the number of HIGH outputs has reached a predetermined portion of the total bits (50% in FIG. 4), the controller 220 will terminate the process and output the signature 232. Otherwise, as shown in FIG. 2, the controller 220 repeats the process until the proportion of bits having a logic high reaches 50% of the total number of output bits. The predetermined time period at which the enable signal is applied to the second input 254 may be recorded in a nonvolatile memory (NVM) on the device 200.

Figure 6:
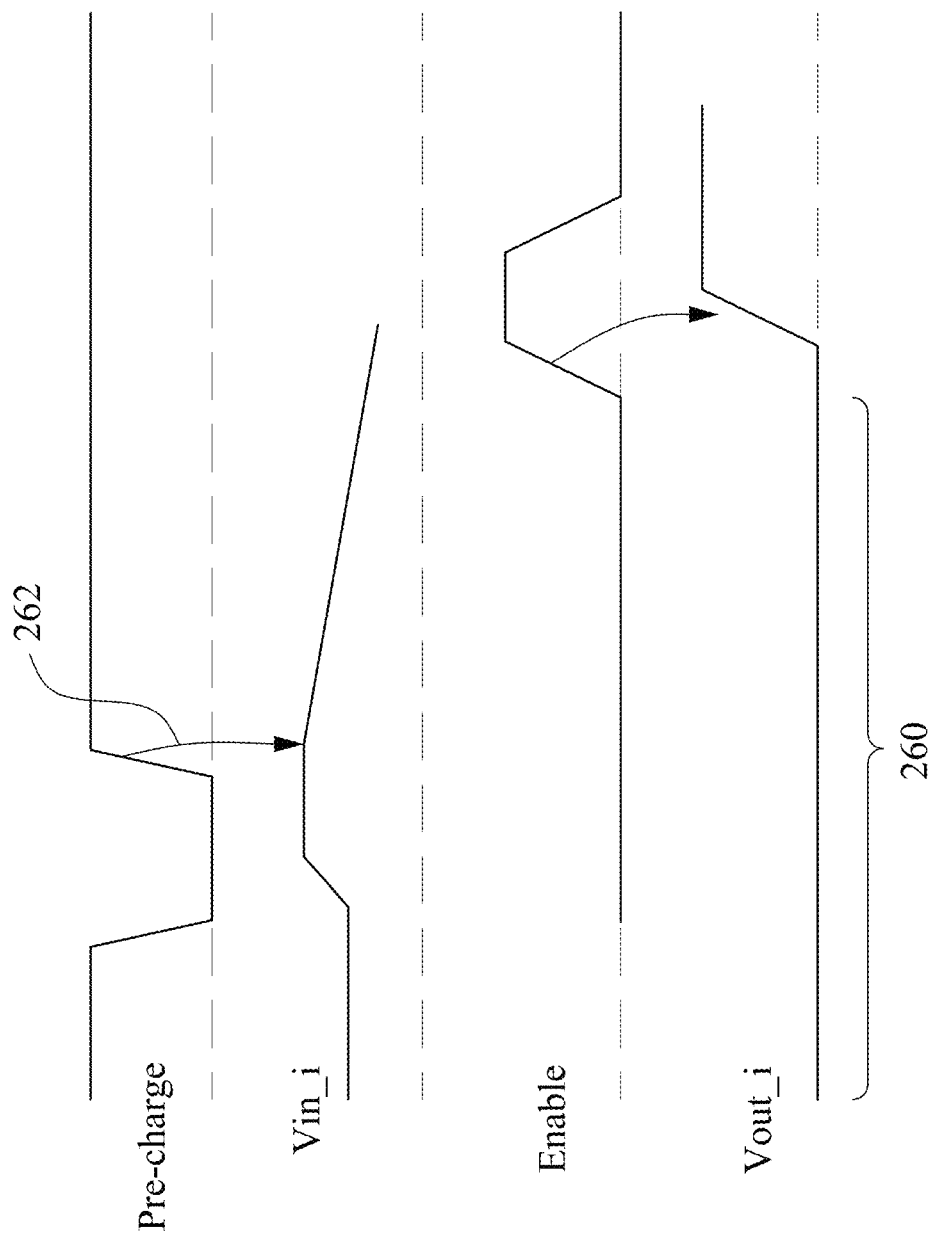
FIG. 6 is an example timing diagram in accordance with some embodiments.

FIG. 6 illustrates a timing diagram for various signals discussed above. When the pre-charge voltage Vpre is removed from the signature wires 210a, the input voltage Vin_i begins to decrease due to leakage to a second lower level 262. Depending on the leakage rate, after some elapsed time, some output nodes will be logic HIGH (1), while others will have fallen to a logic LOW (0) level. After the predetermined time period 260 has elapsed, the enable signal goes HIGH at the second input terminals 254 of the NAND gates 250. If the input voltage Vin_i has fallen to a logic LOW due to leakage as shown in FIG. 6, the output 230 of the NAND gate 250 goes HIGH. The predetermined time period 260 may be adjusted to obtain a balanced distribution of HIGH and LOW outputs of the NAND gates 250.

The voltage level of each of the signature wires 210a decreases due to multiple factors. For instance, there is leakage due to interconnect dielectric. Further there is the junction leakage of the drains of the transistors used for pre-charging the wire pairs 210. Still further, there is gate leakage of the sense amplifiers (NAND gates 250) used to detect the voltage levels of the signature wires 210a. Due to fabrication variations, each of the conductors 210 will leak at a different rate. Therefore the voltage value after a certain elapsed time period will vary among the conductors 210.

Figure 7:
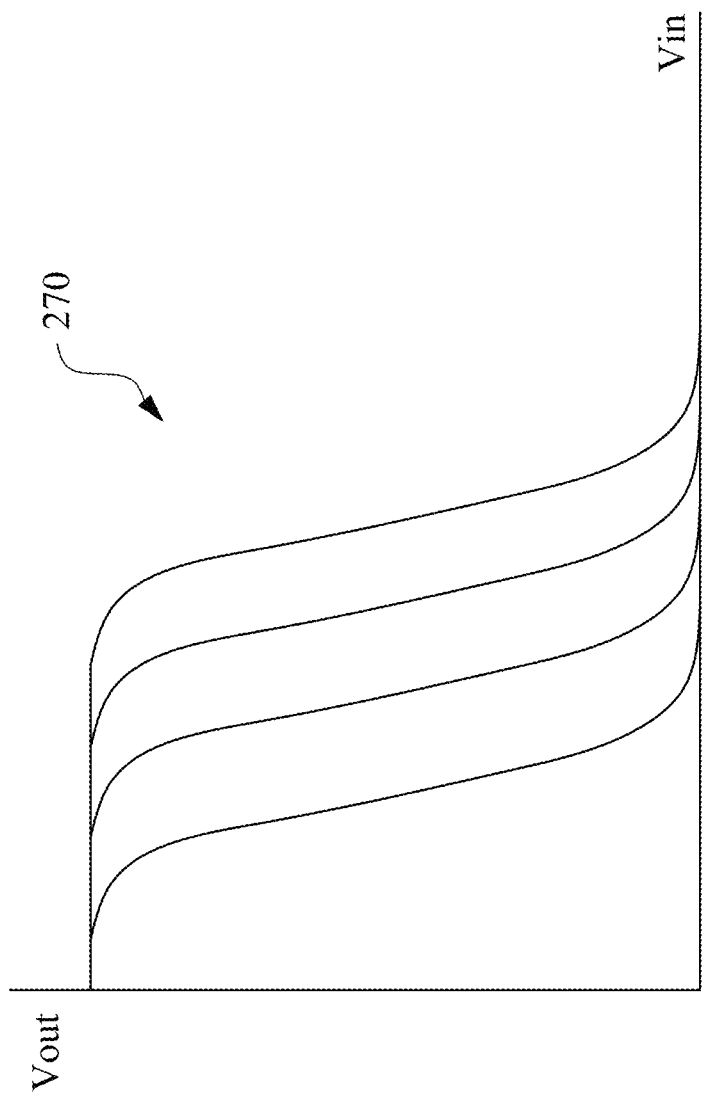
FIG. 7 is an example transfer curve in accordance with some embodiments.

Additional variation is introduced by the transfer curve of the single-ended sense amplifier (NAND gate 250). FIG. 7 illustrates an example of transfer curves 270 for NAND gate 250 when the second input 254 (receiving the enable signal) goes from LOW to HIGH. Depending on the voltage value and the trigger point according to the transfer curve, each signature wire 210a (i.e. each bit of the device signature) will change at a different time. Therefore each IC device will have a unique and different signature.

The speed at which the system 200 generates the device signature 232 depends on factors such as the parasitic capacitance and the leakage of the signature wires 210a. The leakage of each signature wire 210a is the sum of the leakage currents described, including interconnection leakage, drain of the pre-charge transistor 240 junction leakages, gate leakage of the NAND gate 250, etc. There are two paths of interconnection leakage—inter-layer and intra-layer leakage. The inter-layer leakage is due to leakage between one metal layer of the device 200 to the next metal layer. For example, the signature wires may be constructed using a first metal, metal-2. A plate constructed of another metal, metal-1, is grounded and positioned beneath these wires. The intra-layer leakage is due to leakage between adjacent wires on the same metal layer. To increase the intra-layer interconnection leakage, metal spacing design rules may be purposely violated.

Figure 8:
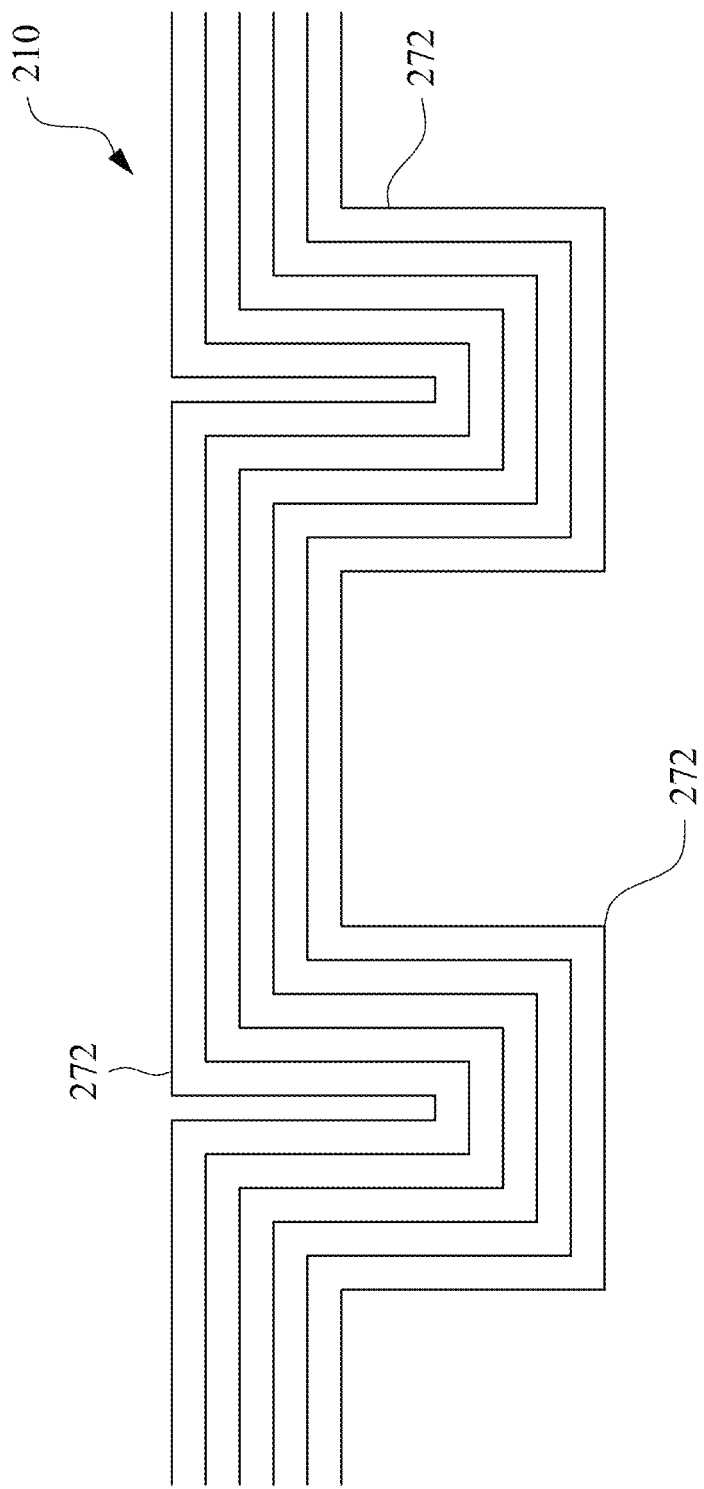
FIG. 8 illustrates an example of conductor patterns including jagged wires accordance with some embodiments.
Figure 9:
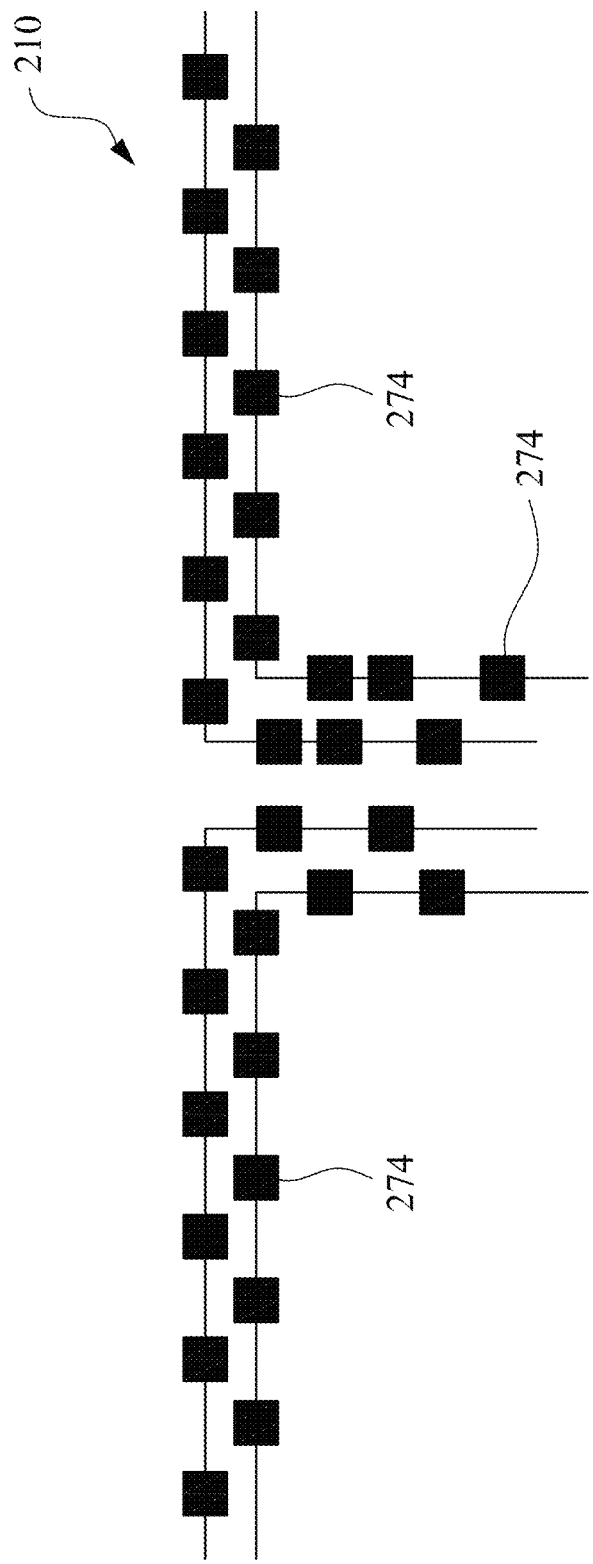
FIG. 9 illustrates an example of conductor patterns including additional contacts and/or vias accordance with some embodiments.

Moreover, different patterns of conducts may be employed to vary the leakage of the signature wires 210a. An example of a set of jagged wires 210 is shown in FIG. 8. The sharp turns in the wires 210 result in a higher field at the corners 272, which further varies leakage of the conductors 210. Still further, Another way to increase the leakage is to purposely violate additional wiring distance layout rules, such as by adding contacts/vias 274 to the wires 210 as shown in FIG. 9.

Thus, disclosed embodiments include a method of generating a signature for a device. The method includes pre-charging a plurality of conductors to a first voltage level. A voltage leakage of each of the conductors is determined, and a device signature is generating based on the determined leakage.

In accordance with further disclosed embodiments, a system for generating a device signature includes a plurality of conductors and a plurality of switching devices configured to selectively connect the plurality of conductors to a power source. A controller is configured to operate the switching devices to pre-charge the plurality of conductors to a first voltage level and output a device signature based on a voltage leakage of the plurality of conductors.

In accordance with still further disclosed embodiments, an integrated circuit device includes a substrate with a plurality of conductors formed on the substrate. A plurality of switching devices are formed on the substrate and are configured to selectively connect the plurality of conductors to a power source terminal. A controller is configured to operate the switching devices to pre-charge the plurality of conductors to a first voltage level and output a device signature based on a voltage leakage of the plurality of conductors.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of generating a signature for a device, comprising:
   providing a plurality of wire pairs, each of the wire pairs including a signature wire and a ground wire;
   controlling a plurality of switching devices to selectively connect the signature wires to a power source and pre-charge the signature wires to a first voltage level;
   determining a voltage leakage of each of the signature wires, including allowing the first voltage level to fall to a second voltage level due to leakage of signature wires and comparing the second voltage level to a predetermined third voltage level;
   generating a device signature based on the comparison of the second voltage level to the predetermined third voltage level; and
   outputting the device signature in response to the second voltage level of a predetermined number of the signature wires reaching the third voltage level.

2. The method of claim 1, wherein the predetermined number of the signature wires is half of the signature wires.

3. The method of claim 1, wherein the second voltage level of the signature wires is compared to the third voltage level after a first elapsed time period.

4. The method of claim 3, wherein if the second voltage level of the predetermined number of the signature wires has not reached the third voltage level after the first elapsed time period, then the second voltage level of the signature wires is compared to the third voltage level after a second elapsed time period.

5. The method of claim 1, wherein each of the signature wires represents one bit of the device signature.

6. The method of claim 1, wherein the third voltage level is a logic LOW level.

7. A system for generating a device signature, comprising:
   a plurality of wire pairs, each of the wire pairs including a signature wire and a ground wire, wherein each of the ground wires is connected to a ground terminal and each of the signature wires corresponds to an output bit of a device signature;
   a plurality of switching devices, each configured to selectively connect a corresponding one of the signature wires to a pre-charge voltage terminal;
   a controller configured to
      operate the switching devices to selectively connect the signature wires to the pre-charge voltage terminal to pre-charge each of the signature wires to a first voltage level;
      after pre-charging, operate the switching devices to disconnect the signature wires from the pre-charge voltage terminal;
      after a first elapsed time period, determine a second voltage level of each of the signature wires;
      based on the determined second voltage level of each of the signature wires, assign a logic value to each of the signature wires, and
      output the device signature based on the assigned logic value of each of the signature wires.

8. The system of claim 7, further comprising a plurality of comparator devices configured to compare the second voltage level of each of the signature wires to a third voltage level.

9. The system of claim 8, wherein:
   each of the comparator devices comprises a NAND gate;
   each of the signature wires is connected to a first input terminal of a corresponding one of the NAND gates; and
   a second terminal of each of the NAND gates is connected to receive an enable signal.

10. The system of claim 9, wherein the controller is configured to apply the enable signal to the second terminals of the plurality of NAND gates after the first elapsed time period.

11. The system of claim 9, wherein the first voltage level is a logic HIGH.

12. The system of claim 8, wherein the controller is configured to output the device signature is response to the plurality of the comparator devices indicating a predetermined number of the signature wires are at a logic LOW due to leakage of the signature wires.

13. The system of claim 12, wherein the predetermined number of the signature wires is half of the signature wires.

14. The system of claim 7, wherein each of the plurality of switching devices includes a transistor having a gate terminal connected to the controller.

15. An integrated circuit device, comprising:
   a substrate;
   a plurality of wire pairs formed on the substrate, each of the wire pairs including a signature wire and an adjacent ground wire such that the signature wires and the ground wires are interleaved;
   a plurality of switching devices formed on the substrate and configured to selectively connect the signature wires to a power source terminal;
   a controller configured to
      operate the switching devices to connect the signature wires to the power source to pre-charge the signature wires to a first voltage level;
      operate the switching devices to disconnect the signature wires from the power source after a predetermined time period;
      allowing the first voltage level of each of the signature wires to fall due to voltage leakage of the wire pairs; and
      in response to a predetermined number of signature wires falling to a predetermined second voltage level, output a device signature based on the voltage leakage of the plurality of wire pairs.

16. The integrated circuit device of claim 15, wherein the controller is formed on the substrate.

17. The integrated circuit device of claim 15, further comprising a plurality of NAND gates formed on the substrate, wherein each of the signature wires is connected to a first input terminal of a corresponding one of the NAND gates, and wherein a second terminal of each of the NAND gates is coupled to receive an enable signal output by the controller.

18. The integrated circuit device of claim 15, wherein each of the signature wires represents one bit of the device signature.

* * * * *